Feb. 11, 1969 E. D. WILKERSON 3,426,438
WHEEL ALIGNMENT ANGLE INDICATOR
Filed Sept. 17, 1965

INVENTOR
EDWARD D. WILKERSON

Feb. 11, 1969 E. D. WILKERSON 3,426,438
WHEEL ALIGNMENT ANGLE INDICATOR
Filed Sept. 17, 1965 Sheet 2 of 2
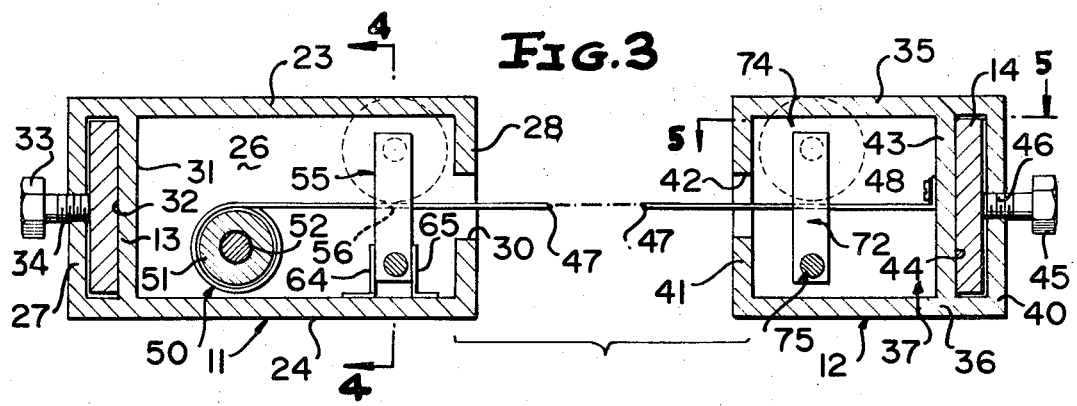
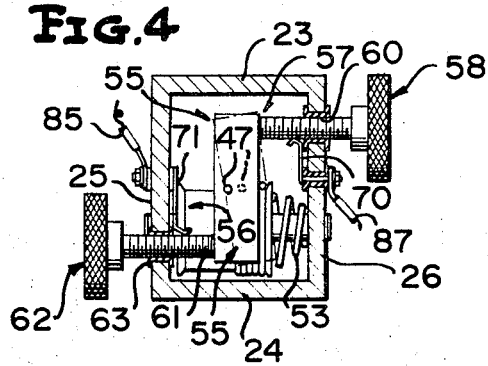
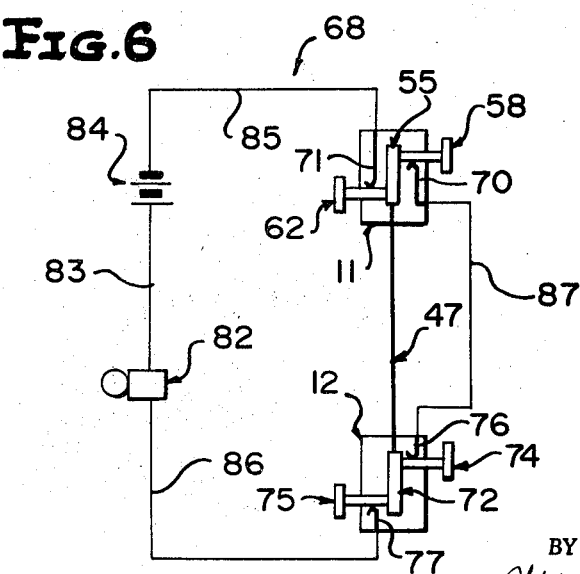
INVENTOR
EDWARD D. WILKERSON
BY Mason, Porter, Willes & Brown
ATTORNEYS United States Patent Office 3,426,438
Patented Feb. 11, 1969

3,426,438
WHEEL ALIGNMENT ANGLE INDICATOR
Edward D. Wilkerson, 280 E. Northfield Road,
Livingston, N.J. 07039
Filed Sept. 17, 1965, Ser. No. 487,983
U.S. Cl. 33—203.2                              20 Claims
Int. Cl. G01b 5/255, 3/56, 3/00

ABSTRACT OF THE DISCLOSURE

This invention relates to an apparatus for indicating the angular position of a pair of automobile wheels, and includes an elongated member which spans a pair of housings adapted for securement to the automobile wheels. The elongated member includes a conductive element supported at a point offset from its center of gravity such that it tends to rotate in a predetermined direction. Contacts are associated with the conductive element for indicating wheel angularity dependent upon the rotation of the conductive element under the influence of gravity.

---

An object of this invention is to provide a novel apparatus for indicating the angular position of a pair of automobile wheels relative to a predetermined reference angle or reference plane, the apparatus including a housing secured to each one of a pair of automobile wheels, an elongated member extending between the housings, and a conductive element coupled to the elongated member at a point offset from the center of gravity of the conductive element whereby the conductive element normally tends to rotate in a predetermined direction, a pair of contacts normally engaging the conductive element when the elongated member is in a predetermined position, indicating means being coupled to the pair of contacts for indicating a first angular position of the wheels relative to a predetermined angle when the contacts and the conductive elements are in contact, and the indicating means being operative for indicating a second angular position of the wheels relative to the reference plane when at least one of the contacts and the conductive element are disengaged due to the angular position of the elongated member relative to the reference plane and the attended rotation of the conductive element under the influence of gravity.

A further object of this invention is to provide a novel apparatus of the type described immediately above in which the elongated member is retractable into one of the housings and means are provided for preventing the movement of the conductive element during the retraction of the elongated member.

Still another object of this invention is to provide a novel wheel alignment angle indicating apparatus including a pair of housings, means for securing each of the housings to an associated automobile wheel, an elongated member extending between the housings, a conductive element coupled to the elongated member in each of the housings at a point offset from the center of gravity of the conductive elements whereby the conductive elements normally tend to rotate in a predetermined direction, a pair of contacts in the plane of rotation of each of the conductive elements and normally in engagement therewith, indicating means coupled to the contacts, the indicating means being operative for indicating a first angular position of the wheels relative to a reference plane when the contacts and conductive elements are in contact, and the indicating means being further operative for indicating a second angular position of the wheels relative to the reference plane when at least one of the contacts and the conductive elements is disengaged due to the angular position of the elongated member relative to the reference plane and the attended rotation of one of the conductive elements under the influence of gravity.

A further object of this invention is to provide a novel apparatus of the type immediately above-described and including means for adjusting the point at which the conductive elements disengage the pairs of contacts for providing an angular range between the reference plane and the elongated member within which the elongated member may vary without a change of indication by the indicating means.

With the above, and other objects in view that will hereinafter appear, the nature of the invention will be more clearly understood by reference to the following detailed description, the appended claims and the several views illustrated in the accompanying drawings:

In the drawings:

FIGURE 3 is an enlarged fragmentary sectional view taken generally along line 3—3 of FIGURE 1 and illustrates a conductive element carried by the elongated member in each of the housings and a contact associated with each conductive element.

FIGURE 4 is a sectional view taken generally along line 4—4 of FIGURE 3, and illustrates the contacts normally engaged with opposite sides of the conductive element and, in phantom outline, the disengagement between one of the contacts and the conductive element.

FIGURE 5 is a fragmentary sectional view taken generally along line 5—5 of FIGURE 3, and more clearly illustrates the contact between another of the conductive elements and the associated pair of adjustable contacts.

FIGURE 6 is a highly schematic view of the apparatus of this invention, and illustrates an audible signalling mechanism forming a portion of an electrical circuit for indicating proper or improper alignment of wheels during the testing thereof.

Figure 1:
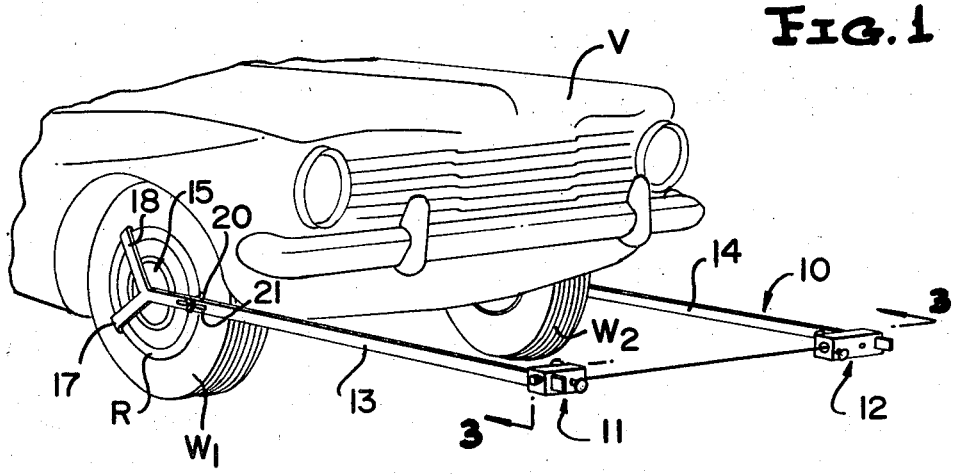
FIGURE 1 is a fragmentary schematic perspective view of a novel apparatus constructed in accordance with this invention, and illustrates the apparatus secured to the front wheels of an automobile during an alignment test.

A novel wheel alignment angle indicator or apparatus for testing the alignment of a pair of wheels W1, W2 of a vehicle V is generally referred to by the reference numeral 10. The apparatus 10 includes a pair of housings 11, 12 carried by an associated bar or rod 13, 14 respectively. Each of the bars 13, 14 includes identical means 15, 16 for securing the apparatus 10 to the respective wheels W1, W2 of the vehicle V. The securing means 15, 16 can be, for example, a pair of bifurcated arms 17, 18 having hook-like ends (unnumbered) which engage the lip (unnumbered) of each wheel rim R. A J-shaped fastener 20 is similarly hooked to the lip of each of the wheel rims R and includes a threaded end portion (unnumbered) passed through a slot 21 of each of the rods 13, 14. An identical wing nut 22 is tightened to fasten the rods 13, 14 to the respective wheels W1, W2 in the manner illustrated in FIGURES 1 and 2 of the drawings during a wheel alignment test.

The housing 11 is best illustrated in FIGURES 3 and 4 of the drawings and includes a top wall 23, a botom wall 24, side wals 25, 26 (FIGURE 4) an end wall 27 and a front wall 28 provided with an opening or aperture 30. A partition 31 (FIGURE 3) defines a channel 32 with the end wall 27 and portions of the top and bottom walls 23, 24 respectively. The rod 13 is slidable in the channel 32 and is adjusted in any selected position thereof by means of a screw 33 threadably received in a threaded bore 34 of the end wall 27. Upon tightening the screw 33 the rod 13 is locked in a predetermined position of adjustment in a manner readily apparent from FIGURES 1-3 of the drawings.

The housing 12 is similar to the housing 11 and includes a top wall 35, a bottom wall 36, side walls 37, 38 respectively (FIGURE 5), an end wall 40 and a front wall 41 provided with an opening or aperture 42. A partition 43 defines a channel 44 with the end wall 40 and portions of the top and bottom walls 35, 36 respectively. The rod 14 is received in the channel 44 and is locked at any selected position of adjustment by means of a screw 45 threadably received in a threaded bore 46 of the end wall 40.

An elongated member 47 is fastened by a screw 48 (FIGURE 3) to the partition 43 of the housing 12. An opposite end portion of the elongated member 47 is secured to a retracting mechanism, generally referred to by the reference numeral 50. The retracing mechanism 50 includes a reel 51 secured to a shaft 52 having opposite end portions (unnumbered) conventionally journalled in the side wall 25, 26 of the housing 11. A torsion spring 53 (FIGURE 4) is secured to both the reel 51 and the side wall 26 of the housing 11. The elognated member 47 is constructed of non-conductive material and is preferably of a flexible construction. When the apparatus 10 is disengaged from the wheels W1, W2 and the housings 11, 12 are moved toward one another, the bias of the torsion spring 53 rotates the reel 51 in a counter-clockwise direction as viewed in FIGURE 3 to wind the elongated member 47 upon the reel 51. Movement of the housings 11, 12 away from each other results in the unwinding of the elongated member 47 from the reel 51 and corresponding coils the spring 53.

A conductive element 55 (FIGURES 3 and 4) which is preferably constructed from metallic material, such as iron, copper, bronze, etc., is housed in the housing 11 adjacent the aperture 30. The conductive element 55 includes a circular opening or aperture 56 (FIGURE 4) through which passes the elongated member 47. The aperture 56 is offset to a vertical plane pasing through the center of gravity of the conductive element 55, as is best illustrated in FIGURE 4 of the drawings. As is illustrated in FIGURE 4, the aperture 56 is located to the left of the center of gravity of the conductive element 55 and the latter therefore tends to rotate in a clockwise direction (unnumbered headed arrow) as viewed in this same figure. In the normal position of the conductive element 55 (solid lines in FIGURE 4) a side 57 of the conductive element 55 contacts or engages a contact 58 in the form of a threaded screw threadably engaged in a threaded bore 60 of the side wall 26. An opposite side 61 of the conductive element 55 similarly engages an end (unnumbered) of a contact 62 which is similarly in the form of a screw threadably received in a threaded bore 63 of the housing side wall 25. The plane of rotation of the conductive element 55 passes through the axes of the screws 58, 62, as is best illustrated in FIGURE 3 of the drawings.

As was heretofore noted, the elongated member 47 is adapted to be wound about or unwound from the reel 51. The aperture 56 in the conductive element 55 is therefore slightly larger than the size of the elongated member 47 to permit relative sliding movement therebetween during the winding or unwinding of the elongated member 47. A pair of generally L-shaped brackets 64, 65 are secured to the bottom wall 24 of the housing 11 and loosely embrace the lower end portion (unnumbered) of the conductive element 55. The brackets 64, 65 permit free pivoting movement of the conductive element 55 but prevent movement of the conductive element 55 to the left or to the right as viewed in FIGURE 3 of the drawings during the respective winding and unwinding of the elongated member 47.

The contacts 58, 62 are coupled to circuit means (FIGURE 6) generally referred to by the reference numeral 68 by respective contact elements 70, 71 in the manner clearly illustrated by the contact element 70 of FIGURE 4.

The housing 12 similarly includes an elongated conductive element 72 having an aperture or opening 73 which receives the elongated member 47. In this case, the conductive element 72 is positively secured to the elongated member 47 and no relative movement between these latter two elements is effective upon the winding or unwinding of the reel 51. However, the conductive elements 72 can, as in the case of the conductive element 55, be loosely received in the aperture 73 and brackets corresponding to the brackets 64, 65 could be employed in the housing 12 for maintaining the conductive element 72 in the position illustrated in FIGURES 3 and 5 of the drawings.

The aperture 73 is also offset from the center of gravity of the conductive element 72 and the latter tends to rotate in a vertical plane through the axes of a pair of contacts 74, 75. The contacts 74, 75 correspond to the contacts 58, 62 of the housing 11, and a further description thereof is considered unnecessary for a complete understanding of this invention. A pair of contacts 76, 77 (FIGURE 6) corresponding to the contacts 70, 71 of FIGURE 4 maintain the contacts 74, 75 respectively in conducting relationship when the contacts 74, 75 are normally engaged with opposite surfaces 80, 81 of the conductive element 72, as is best illustrated in FIGURE 5 of the drawings.

Reference is now made to FIGURE 6 of the drawings, which illustrates the circuit means 68 in the normal position thereof, i.e., with the conductive elements 55, 72 engaging the respective contacts 58, 62 and 74, 75. This is the "closed" position of the circuit means 68 in which an indicating mechanism 82, such as an electrical buzzer, is actuated to give an audible signal when the wheels W1, W2 of the vehicle V are in proper alignment, as will be more fully described hereinafter. The buzzer 82 is connected by a conductor 83 to a D.C. battery 84. The negative side of the battery 84 is connected by a conductor 85 to the contact 71. The buzzer 82 is also connected by a conductor 86 to the contact 77. A conductor 87 connects the contacts 70 and 76. This series of connections of the various elements of the circuit means 68 effects the de-energization of the indicating means or buzzer 82 at any time the circuit is "open" by the disengagement of any one of the contacts 58, 62, 74, and 75 with a respective one of the associated conductive elements 55, 72.

Figure 2:
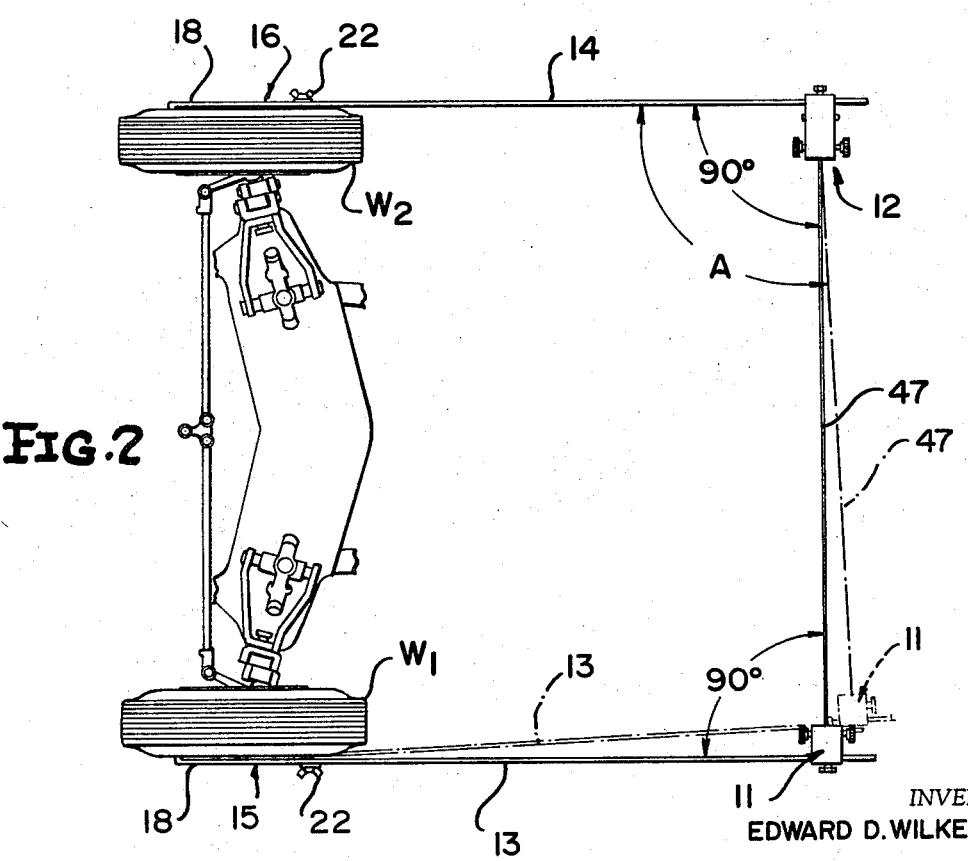
FIGURE 2 is a top plan view of the automobile and the apparatus, and illustrates an elongated member extending between two housings secured to an associated one of the automobile wheels.

Referring to FIGURE 2 of the drawing in particular, the wheels W1, W2 of the vehicle V are illustrated in generally parallel relationship. In this position each of the rods 13, 14 defines an angle of approximately 90 degrees with the elongated member 47 of the apparatus 10. In actual practice the angle between the elongated member 47 and the rods 13, 14, which may be considered to define reference planes relative to the elongated member 47, is generally less than the illustrated 90 degrees due to the conventional toeing-in of the wheels W1, W2. However, assuming the 90 degree angles of FIGURE 2 to be the desired angular relationship of the wheels W1, W2, the conductive elements 55, 72 are in contact with the respective contacts 58, 62 and 74, 75 which maintains the circuit means 68 closed, as illustrated in FIGURE 6 of the drawings. In this position the buzzer 82 is energized and the audible signal thereof indicates that the angular relationship of the wheels W1, W2 is correct.

If, however, either of the 90 degree angles of FIGURE 2 is increased or decreased due to improper front end alignment of the wheels W1, W2, one of the contacts between the conductive elements 55, 72 and the contacts 58, 62, 74 and 75 will be broken, the circuit 68 deenergized and the buzzer 82 silenced to indicate improper alignment. One example of improper alignment of the wheels W1, W2 is illustrated in phantom outline in FIG- URE 2 of the drawings to which attention is now directed.

With the wheel W1, toed-in an improper amount, the rod 13 (phantom outline) secured to the wheel W1 converges toward the rod 14 and the elongated member 47 (phantom outline) defines an angle A relative to the rod 14 which is greater than 90 degrees. This increased angle is created by, in effect, the shifting of the elongated member 47 from the solid to the phantom outline position in FIGURE 2. This shifting of the elongated member 47 is also illustrated in phantom outline in FIGURE 4 of the drawings. As the elongated member 47 moves from the solid to the phantom outlined positions in each of FIGURES 2 and 4 of the drawings, the conductive element 55 is pivoted or rotated in a counterclockwise direction, as viewed in FIGURE 4 about a pivot point defined by the contact between the surface 57 of the conductive element 55 and the end (unnumbered) of the contact 58. As the conductive element 55 moves from the solid to the phantom outline position in FIGURE 4, the contact between the contact 62 and the surface 61 of the conductive element 55 is broken, as is illustrated in phantom outline in FIGURE 4, and the circuit 68 is similarly opened causing the silencing of the buzzer 82 which indicates improper wheel alignment.

A similar indication of improper wheel alignment will take place when, for example, the wheel W2 has an improper toe-in angle. Similar indications of improper wheel alignment will occur if the wheels W1, W2 are improperly toed-out or if the combined toe-in-toe-out is improper. In all cases of misalignment of the wheels W1, W2 at least one of the contacts 58, 62, 74 and 75 will be disengaged with an associated conductive element 55, 72 and an indication of improper wheel alignment indicated by the silencing of the buzzer 82.

As another example of the operation of the apparatus 10, it is assumed that the wheel W1 is improperly toed-out (not shown). In this case the elongated member 47 would be shifted from the solid line position in FIGURES 2 and 4 to a position left of the illustrated solid line position. As is readily visualized in FIGURE 4 of the drawings, the shifting of the elongated member 47 from the solid line position to the left causes a counterclockwise pivoting or rotation of the conductive element 55 at the point of contact between the contact 62 and the surface 61 to break the contact between the surface 57 and the end of the contact 58. The breaking of this latter-noted contact again results in the deenergization of the circuit means 68 and the silencing of the signal emitted by the buzzer 82 to indicate improper wheel alignment. In this manner the apparatus indicates improper alignment of the wheel W1, at an angle greater than or less than 90 degrees due to the selective opening of either of the contacts 58, 62. A similar indication of the misalignment of the wheel W2 is indicated by the opening of one of the contacts 74, 75 in a manner deemed obvious from the above examples.

The adjustable arrangement of the contacts 58, 62 74 and 75 permits the apparatus 10 to not only indicate true alignment at one exact angle (90 degrees in the above example) by an audible signal and misalignment by silence at either side of this angle, but also permits an adjustment to either side of the desired angle before indicating misalignment. For example, if the included angle between the phantom and solid outline positions of the elongated member 47 in FIGURE 2 is one degree the contact between the surface 61 of the conductive element 55 and the contact 62 will be broken when the angle A is ninety-one degrees. If it is desired to increase this one degree tolerance, the contacts 58, 62 are adjusted in a manner which would require a greater or lesser amount of movement of the elongated member 47 from the solid to the phantom outline position shown in FIGURES 2 and 4 before the circuit is opened by the disengagement between the surface 61 of the conductive element 55 and the contact 62. Similar adjustments may be made by adjusting the contact 74, 75 and, by adjusting all of the contacts the tolerance between the desired angle (90 degrees) and an angle to either side thereof i.e., eighty degrees and ninety-two degrees for example, may be obtained by the apparatus 10. This is highly desirable in that different automotive manufacturers recommend different wheel alignment tolerances and the apparatus 10 is therefore, sufficient versatile to test generally all domestic and foreign automobiles.

While the apparatus 10 has been heretofore described in its preferred embodiment, modifications thereof may be made within the scope of this invention. For example, while the conductive element 55 is preferably supported by the elongated member 47 offset to a vertical plane passing through the center of gravity of the conductive element 55, the conductive element 55 could be supported by the elongated member 47 by an opening having an access in a vertical plane passing through the center of gravity of the element 55. In this case, the conductive element 55 would be urged against one or the other of the contacts 58, 62 by a light compression spring between the housing 23 and the conductive element 55. The conductive element 72 could be similarly supported and spring biased.

From the foregoing it will be seen that novel and advantageous provisions have been made for carrying out the desired end. However, attention is again directed to the fact that additional variations may be made in this invention without departing from the spirit and scope thereof as defined in the appended claims.

I claim:
1. Apparatus for indicating the angular position of a pair of automobile wheels relative to a reference plane comprising a pair of housings, means for securing each of the housings to an associated one of the wheels, an elongated member extending between said housings, a conductive element coupled to said elongated member in each of said housings, a pair of contacts in each of said housings normally engaging a respective one of the conductive elements in its respective housing when said elongated member is in a predetermined position, circuit means, said circuit means including means connecting said contacts, a power source and indicating means forming portions of said circuit means, said indicating means being operative for indicating a first angular position of the wheels relative to the reference plane when said contacts and conductive elements are in the normal positions thereof, and said indicating means being operative for indicating a second angular position of the wheels relative to the reference plane when at least one of said contacts and said conductive elements are disengaged due to the angular position of said elongated member relative to said reference plane.

2. Apparatus for indicating the angular position of a pair of automobile wheels relative to a reference plane comprising a pair of housings, means for securing each of said housings to an associated one of said wheels, an elongated member extending between said housings, a conductive element coupled to said elongated member at a point offset from the center of gravity of said conductive element whereby said conductive element normally tends to rotate in a predetermined direction, a pair of contacts normally engaging said conductive element when said elongated member is in a predetermined position, circuit means, said circuit means including means connecting said contacts, a power source and indicating means forming portions of said circuit means, said indicating means being operative for indicating a first angular position of the wheels relative to the reference plane when said contacts and conductive elements are in contact, and said indicating means being operative for indicating a second angular position of the wheels relative to the reference plane when at least one of said contacts and said conductive elements are disengaged due to the angular position of said elongated member relative to said reference plane and the attended rotation of said element under the influence of gravity.

3. Apparatus for indicating the angular position of a pair of automobile wheels relative to a reference plane comprising a pair of housings, means for securing each of said housings to an associated one of the wheels, an elongated member extending between said housings, a conductive element coupled to said elongated member at a point offset from the center of gravity of said conductive element whereby said conductive element normally tends to rotate in a predetermined direction, a pair of contacts in the plane of rotation of said conductive element and normally in engagement therewith, indicating means coupled to said contacts, said indicating means being operative for indicating a first angular position of the wheels relative to the reference plane when said contacts and conductive element are in contact, and said indicating means being further operative for indicating a second angular position of the wheels relative to the reference plane when at least one of said contacts and said conductive element is disengaged due to the angular position of said elongated member relative to said reference plane and the attended rotation of said element under the influence of gravity.

4. Apparatus for indicating the angular position of a pair of automobile wheels relative to a reference plane comprising a pair of housings, means for securing each of said housings to an associated one of the wheels, an elongated member extending between said housings, a conductive element coupled to said elongated member at a point offset from the center of gravity of said conductive element whereby said conductive element normally tends to rotate in a predetermined direction, a pair of contacts in the plane of rotation of said conductive element and normally in engagement therewith, indicating means coupled to said contacts, said indicating means being operative for indicating a first angular position of the wheels relative to the reference plane when said contacts and conductive element are in contact, said indicating means being further operative for indicating a second angular position of the wheels relative to the reference plane when at least one of said contacts and said conductive element is disengaged due to the angular position of said elongated member relative to said reference plane and the attended rotation of said element under the influence of gravity, and said pair of contacts being positioned on opposite sides of said conductive element and on opposite sides of the point of coupling between the elongated member and the conductive element.

5. Apparatus for indicating the angular position of a pair of automobile wheels relative to a reference plane comprising a pair of housings, means for securing each of said housings to an associated one of the wheels, an elongated member extending between said housings, a conductive element coupled to said elongated member at a point offset from the center of gravity of said conductive element whereby said conductive element normally tends to rotate in a predetermined direction, a pair of contacts in the plane of rotation of said conductive element and normally in engagement therewith, indicating means coupled to said contacts, said indicating means being operative for indicating a first angular position of the wheels relative to the reference plane when said contacts and conductive element are in contact, said indicating means being further operative for indicating a second angular position of the wheels relative to the reference plane when at least one of said contacts and said conductive element is disengaged due to the angular position of said elongated member relative to said reference plane and the attended rotation of said element under the influence of gravity, and means for adjusting the point at which said conductive element disengages at least one of said contacts for providing a range between said first and second angular positions within which the angular position of said elongated member relative to said reference plane may vary without a change of indication by said indicating means.

6. Apparatus for indicating the angular position of a pair of automobile wheels relative to a reference plane comprising a pair of housings, means for securing each of said housings to an associated one of the wheels, an elongated member extending between said housings, a conductive element coupled to said elongated member at a point offset from the center of gravity of said conductive element whereby said conductive element normally tends to rotate in a predetermined direction, a pair of contacts in the plane of rotation of said conductive element and normally in engagement therewith, indicating means coupled to said contacts, said indicating means being operative for indicating a first angular position of the wheels relative to the reference plane when said contacts and conductive element are in contact, said indicating means being further operative for indicating a second angular position of the wheels relative to the reference plane when at least one of said contacts and said conductive element is disengaged due to the angular position of said elongated member relative to said reference plane and the attended rotation of said element under the influence of gravity, and winding means in one of said housings about which said elongated members can be wound.

7. Apparatus for indicating the angular position of a pair of automobile wheels relative to a reference plane comprising a pair of housings, means for securing each of said housings to an associated one of the wheels, an elongated member extending between said housings, a conductive element coupled to said elongated member at a point offset from the center of gravity of said conductive element whereby said conductive element normally tends to rotate in a predetermined direction, a pair of contacts in the plane of rotation of said conductive element and normally in engagement therewith, indicating means coupled to said contacts, said indicating means being operative for indicating a first angular position of the wheels relative to the reference plane when said contacts and conductive element are in contact, said indicating means being further operative for indicating a second angular position of the wheels relative to the reference plane when at least one of said contacts and said conductive element is disengaged due to the angular position of said elongated member relative to said reference plane and the attended rotation of said element under the influence of gravity, and means for adjustably positioning each of said housings relative to an associated securing means.

8. Apparatus for indicating the angular position of a pair of automobile wheels relative to a reference plane comprising a pair of housings, means for securing each of said housings to an associated one of the wheels, an elongated member extending between said housings, a conductive element coupled to said elongated member at a point offset from the center of gravity of said conductive element whereby said conductive element normally tends to rotate in a predetermined direction, a pair of contacts in the plane of rotation of said conductive element and normally in engagement therewith, indicating means coupled to said contacts, said indicating means being operative for indicating a first angular position of the wheels relative to the reference plane when said contacts and conductive element are in contact, said indicating means being further operative for indicating a second angular position of the wheels relative to the reference plane when at least one of said contacts and said conductive element is disengaged due to the angular position of said elongated member relative to said reference plane and the attended rotation of said element under the influence of gravity, said pair of contacts being positioned on opposite sides of said conductive element and on opposite sides of the point of coupling between the elongated member and the conductive element, and means for adjusting the point at which said conductive element disengages at least one of said contacts for providing a range between said first and second angular positions within which the angular position of said elongated member relative to said reference plane may vary without a change of indication by said indicating means.

9. In an indicating apparatus of the type including a pair of normally spaced housings, an elongated member extending between the housings, and means for retracting the elongated member into one of the housings, the improvement comprising a conductive element positioned at a predetermined point in one of said housings, means coupling said element to said elongated member, and means for retaining said element at said predetermined point upon the retracting of said elongated member into said one of the housings.

10. The indicating apparatus of the type defined in claim 9 wherein said coupling means couples said element and said elongated member for relative sliding movement.

11. In an indicating apparatus as defined in claim 9 wherein said element is conductive, and stationary contact elements are disposed adjacent said conductive element irrespective of the position of retraction of said elongated member relative to said one housing.

12. In an indicating apparatus as defined in claim 9 wherein said coupling means couples said element and said elongated member for relative sliding movement and wherein said element is conductive, and stationary contact elements are disposed adjacent said conductive element irrespective of the position of retraction of said elongated member relative to said one housing.

13. In an indicating apparatus of the type including a pair of normally spaced housings, an elongated member extending between the housings, and means for retracting the elongated member into one of the housings, the improvement comprising a conductive element positioned at a predetermined point in one of said housings, means coupling said element to said elongated member for rotation in a plane substantially normal to the longitudinal axis of said elongated member, contacts in said plane at opposite sides of said conductive element and at opposite sides of said elongated member, said conductive element being in engagement with both of said contacts in a first position and being disengaged with at least one of said contacts in a second position, means for indicating said first and second positions, and means for retaining said element at said predetermined point upon the retracting of said elongated member into said one of the housings.

14. In an indicating apparatus as defined in claim 13 including means for adjusting said contacts relative to said conductive element to vary the points of engagement therebetween thereby adjusting the indication by said indicating means.

15. In an indicating apparatus of the type including a pair of normally spaced housings, an elongated member extending between the housings, and at least a pair of contacts in each of said housings, the improvement comprising a conductive element supported by the elongated member for movement in a plane common to the contacts, the conductive elements being supported by the elongated member at a point offset from the center of gravity of the conductive elements whereby the latter tend to rotate under the influence of gravity in said plane whereby each pair of contacts and an associated conductive element are in engagement in a first position, circuit means coupled to said contacts, said circuit means including indicator means, and said indicator means being operative in a first position to indicate contact between each of said contacts and the conductive elements and further indicating a second position in which at least one of said contacts and an associated conductive element are disengaged.

16. The indicating apparatus as defined in claim 15 including means for adjusting the point of contact between each of the contacts and the associated conductive elements.

17. The indicating apparatus as defined in claim 15 including means for retracting said elongated member into one of said housings, and means for preventing the movement of at least one of said conductive elements during the retraction of said elongated member.

18. Apparatus for indicating the angular position of a pair of automobile wheels relative to a reference plane comprising a pair of housings, means for securing each of the housings to an associated one of the wheels, an elongated member extending between said housings, a conductive element in each of said housings coupled to said elongated member, a pair of contacts in each of said housings normally engaging a respective one of the conductive elements in its respective housing when said elongated member is in a first position, circuit means, said element and pair of contacts forming a portion of said circuit means, said circuit means including indicator means, said indicator means being operative for indicating a first angular position of the wheels relative to the reference plane when said contacts and element are in the first position thereof, said indicator means being operative for indicating a second angular position of the wheels relative to the reference plane when at least one of said contacts and said elecents are disengaged in the second relative position due to the angular position of said elongated member relative to said reference plane, and means for adjusting the contacts relative to an associated one of the elements for varying the disengagement point of the elements and the contacts.

19. Apparatus for indicating the angular position of a pair of automobile wheels relative to a reference plane comprising an elongated member, means for securing opposite ends of said elongated member to automobile wheels, a conductive element coupled to said elongated member at opposite end portions thereof, a pair of contacts in each of said housings normally engaging a respective one of the conductive elements in its respective housing when said elongated member is in a predetermined position, circuit means, said circuit means including means connecting said contacts, a power source and indicating means forming portions of said circuit means, said indicating means being operative for indicating a first angular position of the wheels relative to the reference plane when said contacts and conductive elements are in the normal positions thereof, and said indicating means being operative for indicating a second angular position of the wheels relative to the reference plane when at least one of said contacts and said conductive elements are disengaged due to the angular position of said elongated member relative to said reference plane.

20. The apparatus as defined in claim 19 wherein said conductive elements are coupled to said elongated member at a point offset from the center of gravity of said conductive elements whereby said conductive elements normally tend to rotate in a predetermined direction.

References Cited

UNITED STATES PATENTS

| 2,240,753 | 5/1941 | Bouchard et al. | 33—138 |
| 2,624,123 | 1/1953 | Wilkerson | 33—203.2 |
| 2,728,143 | 12/1955 | Buchet | 33—138 |
| 2,788,584 | 4/1957 | Adrien | 33—1 X |
| 3,164,910 | 1/1965 | Manlove | 33—203.18 |
| 3,181,248 | 5/1965 | Manlove | 33—203.18 |
| 3,199,208 | 8/1965 | Hunter | 33—203.21 |

WILLIAM D. MARTIN, Jr., *Primary Examiner.*

U.S. Cl. X.R.

33—203.18, 138